US010810209B2

(12) United States Patent
Richardson (10) Patent No.: US 10,810,209 B2
(45) Date of Patent: Oct. 20, 2020

(54) TRANSACTION-BASED REFRESH OF A LONG DATABASE TRANSACTION'S WORKSPACE

(71) Applicant: Ordnance Survey Limited, Southampton, Hampshire (GB)

(72) Inventor: Mark Richardson, Southampton (GB)

(73) Assignee: Ordnance Survey Limited, Southampton, Hampshire (GB)

( * ) Notice: Subject to any disclaimer, the term of this patent is extended or adjusted under 35 U.S.C. 154(b) by 437 days.

(21) Appl. No.: 15/800,575

(22) Filed: Nov. 1, 2017

(65) Prior Publication Data

US 2018/0129711 A1 May 10, 2018

(30) Foreign Application Priority Data

Nov. 4, 2016 (EP) .................................. 16197438

(51) Int. Cl.
*G06F 16/00* (2019.01)
*G06F 16/2455* (2019.01)
*G06F 16/22* (2019.01)
*G06F 16/23* (2019.01)

(52) U.S. Cl.
CPC .... *G06F 16/24566* (2019.01); *G06F 16/2282* (2019.01); *G06F 16/2329* (2019.01)

(58) Field of Classification Search
CPC ........... G06F 16/24566; G06F 16/2329; G06F 16/2282
See application file for complete search history.

(56) References Cited

U.S. PATENT DOCUMENTS

| 6,012,059 | A * | 1/2000 | Neimat ................... G06F 16/27 |
| 2005/0021567 | A1* | 1/2005 | Holenstein .......... G06F 16/2365 |
| 2005/0091180 | A1* | 4/2005 | Peleg .................. G06F 16/2393 |
| 2005/0102326 | A1* | 5/2005 | Peleg .................. G06F 16/2455 |
| 2006/0200507 | A1* | 9/2006 | Holenstein .......... G06F 11/2048 |

(Continued)

OTHER PUBLICATIONS

Chung-leung Pang et al, "On Using Similarity for Resolving Conflicts at Commit in Mixed Distributed Real-time Databases", Aug. 6, 2002, pp. 1-9 (Year: 2002).*

(Continued)

*Primary Examiner* — Jared M Bibbee
(74) *Attorney, Agent, or Firm* — Banner & Witcoff, Ltd.

(57) ABSTRACT

Aspects of the present disclosure aim to improve upon systems for managing long database transactions, and the way in which changes made to a database from within a workspace view during a long transaction are committed to the underlying parent database. The present disclosure aims to solve problems caused by the need to refresh a workspace view as part of the process of resolving conflicts between competing workspace views operating on the same portions of the database. Aspects described herein solve the problem through the creation of a separate data structure which effectively logs all of the further transactions which commit changes to parent database. The data structure can be arranged to include all changes committed after a first transaction is opened and worked upon. The process of committing the changes made in the first transaction to the workspace includes performing a recursive search using the data structure.

20 Claims, 8 Drawing Sheets

(56) References Cited

U.S. PATENT DOCUMENTS

| | | | | |
|---|---|---|---|---|
| 2010/0114905 | A1* | 5/2010 | Slavik | G06F 16/29 |
| | | | | 707/743 |
| 2010/0191884 | A1* | 7/2010 | Holenstein | G06F 11/2094 |
| | | | | 710/200 |
| 2010/0211554 | A1* | 8/2010 | Reid | G06F 16/2315 |
| | | | | 707/703 |
| 2012/0136839 | A1* | 5/2012 | Eberlein | G06F 16/2315 |
| | | | | 707/690 |

OTHER PUBLICATIONS

"Oracle Database Workspace Manager Developer's Guide," 12c Release 1 (12.1), Jul. 2014, 362 pages.

Aug. 22, 2019—(EP) Communication under Rule 71(3) EPC—Application No. 16197438.1.

Henskens, Frans A., "Journal of Object Technology Graph-based Optimistic Transaction Management," Journal of Object Technology, Aug. 1, 2007, pp. 131-148.

Feb. 28, 2017—(EP) Extended Search Report—App 16197438.1.

\* cited by examiner

| A | B | C | D | E |
| F | G | H | I | J |
| K | L | M | N | O |

FIG. 4

| A | B | C | D | E |
| F | G | H | I | J |
| K | L | M | N | O |

FIG. 5a

| A | B | C | D | E |
| F | G | H | I | J |
| K | L | M | N | O |

TRANSACTION-BASED REFRESH OF A LONG DATABASE TRANSACTION'S WORKSPACE

FIELD

Aspects described herein relate to computer systems and databases. More particularly, aspects described herein relate to managing database transactions, and long database transactions.

BACKGROUND

In many computing contexts, long database transactions allow different users of a database to work independently of each other for an extended period of time, a transaction typically taking from days to months to complete. During this period, an individual database user has their own view of the database (referred to hereafter as a 'workspace') within which only the individual user's own changes are visible. Changes made by other users are generally not visible, even when those users' long transactions have completed.

'Optimistic Locking' is an approach to working with long database transactions where it is assumed to be unlikely that two or more users might attempt to update the same data. Write-access is not 'locked' to an individual user. Every user is permitted to change any database record, so there is the possibility that different users might make 'conflicting' updates. Typically, two updates are regarding as being in conflict if they update the same database record or are incompatible in some other way, such as one deleting a particular database record and the other creating a new reference to that record.

Where conflicting updates are made to a database record, they will be detected when an attempt is made to commit the second of the two long transactions. The commit will fail and action must then be taken to resolve the conflict in some way. The action required is to decide how to combine or reject the competing changes. It might be achieved via user decisions, an automated (rules-based) process, or a combination of the two.

In the contrasting 'pessimistic locking' approach, individual users are granted exclusive write permission on particular sets of database records. Conflicts are then not possible, but a user wishing to perform an update might have to wait for write permission.

Resolving a conflict will sometimes make changes that were made by a further long transaction visible in the 'Workspace' of the long transaction which encountered the conflict, ie. if the action taken to resolve the conflict accepts those changes. That further long transaction will generally have also made changes to other database records which do not conflict with changes made by the long transaction which has encountered conflicts. Following resolution of conflicts, some, but not all, of that earlier, further long transaction's changes are therefore visible in the workspace of the long transaction which encountered conflicts. Within the open workspace, the previously made changes are seen out of the context in which they were made. They may appear to a user to be incorrect and may actually be detected as errors by a validation process if run on the view of the data seen in the workspace of the long transaction which encountered conflicts.

If user involvement is needed as part of the process of resolving conflicts and/or if a policy exists of only allowing an attempt to commit a long transaction if a validation process has indicated that the view of the dataset seen in its workspace satisfies a set of business rules, then those other, non-conflicting, updates made by earlier long transactions also need to be made visible. The process of making changes visible in the workspace of an open long transaction where they have occurred since the transaction was started is referred to as 'refreshing' that workspace.

Existing solutions for 'refreshing' typically attempt to re-baseline the view of the dataset seen in an open long transaction's workspace to the view that is current in its parent workspace. This means applying all changes which have occurred (to the entire dataset) in the parent workspace since the open transaction was started. For very large datasets, this sort of approach can take a long time (many hours, or even days) to complete, which might not be acceptable.

SUMMARY

Embodiments and aspects of the present disclosure aim to improve upon systems for managing long database transactions, and the way in which changes made to a database from within a workspace view during a long transaction are committed to a parent workspace. Aspects described in the present disclosure aim to solve problems caused by the need to refresh a workspace when conflicts are resolved between competing workspace operating on the same portions of the database. Aspects described herein solve the problem that refreshing a workspace view can take a prohibitively long time, through the creation of a separate data structure which effectively logs all of the further transactions which commit database record changes to a workspace after a first transaction is opened and worked upon. Then, when a user has finished working upon the first transaction, which may be days or weeks after the first transaction was opened, the process of committing the changes made in the first transaction to the workspace includes using the data structure to ascertain which transactions worked on the same records worked on in the first transaction. If any further transactions are identified that have acted upon the same records as the first transaction, then the system then identifies all of the further records acted upon within these further transactions, and in turn will recursively find any further transactions in which these further records have been acted upon. It will be apparent that this system first identifies those transactions which are directly related to the changes made in the first transaction, and that it also identifies transactions that are indirectly related. Since the process is recursive, the number of transactions that will be identified is arbitrary, but limited to those transactions which committed changes to the parent workspace after the first transaction was opened.

According to a first aspect, there is provided a method, comprising opening a first transaction from a parent database, the parent database comprising a number of database records, and the first transaction comprising a workspace view of the parent database taken at a first time, creating a data structure, the data structure including any further transaction's changes committed to the parent workspace while the first transaction is open, within the transaction, making a change to data relating to a first record within the database; closing the first transaction at a second time that is later than the first time by committing the changes, wherein committing the changes comprises:

recursively searching the data structure to identify further transactions having acted on the first record, and for any further records acted upon by the further transactions, identifying any still further transactions having acted upon the further records, until no further transactions are found; and refreshing the workspace view of the first transaction with the changes to the records acted upon by the further transactions identified in the recursive search.

Aspects described herein improve the process of refreshing a workspace which encounters conflicts with changes applied to its parent workspace in a system in which multiple users work on a database at any given time. This is because, at the time of committing changes and resolving any conflicts that have arisen, rather than "re-baselining" the workspace of the user for which conflicts have been identified, the only records and transactions which are refreshed are those that are directly or indirectly linked to those records acted upon by the open transaction. Re-baselining, i.e. bringing the open workspace up to date with every change made to the database, may take many hours, or even days in the context of a system having millions, or hundreds of millions of records, and this is avoided using one or more techniques presented herein.

Preferably, the data structure comprises a transaction identifier and record identifier for each transaction which has committed changes to the parent workspace after time A. Using a data structure in this way provides a simple and effective source which can be referenced to identify and resolve conflicts.

Preferably, the database records relate to one or more spatial features.

Preferably, recursively searching the data structure comprises the following steps:

i. identifying, using the data structure, a second transaction having made a change to the first record at a time between the first time and the second time;

ii. identifying, using the data structure, a further record acted upon by the second transaction;

iii. identifying, using the data structure, whether a further transaction has acted upon the further record and committed a change to the parent database, and if so:

iv. repeating step ii) and step iii) for any identified further transaction, until no further transaction is identified;

v. incorporating the change or changes identified in steps ii) to iv) into the workspace view of the first transaction.

Preferably, one method further comprises rejecting or combining the change or changes identified in the recursive search; and committing the resulting workspace view change or changes to the parent workspace and closing the first transaction.

The recursive search provides a way of ensuring that conflicting changes to records in the database can be quickly identified and refreshed into the workspace without the need for re-baselining. The addition of the step of combining or rejecting the changes made in the further records leads to a combined refresh and conflict resolution method which increases the efficiency of the system.

Preferably, the recursive search of the data structure comprises a traversing a graph, wherein the graph nodes are earlier completed transactions, and each graph edge between two nodes signifies that there exists at least one record that both transactions have acted upon.

Preferably, acting upon a record comprises at least one of: creating a record, modifying a record, deleting a record, creating a reference to a record, removing a reference to a record.

Preferably, creating the database structure takes place as part of closing the first transaction, and comprises referencing a master table comprising changes made to the parent database workspace, and removing any reference to transactions which were completed before the first transaction was opened.

Preferably, creating the database structure takes place as part of opening the first transaction, and is updated by database triggers, triggered when any further transaction is completed and commits changes to the live database workspace.

According to a second aspect there is provided a networked computer system comprising: a database server and a distributed database system, and a network connecting the database system to the distributed database system, the system being arranged to:

when a first transaction from a parent database is opened at a first time, create a data structure, the data structure being automatically modified each time any further transaction's changes are committed to the parent database workspace while the first transaction is open, and when the first transaction is closed at a second time that is later than the first time, and a change to data relating to a first record within the database has been made; commit the changes, wherein committing the changes comprises:

recursively searching the data structure to identify further transactions having acted on the first record, and for any further records acted upon by the further transactions, identifying any still further transactions having acted upon the further records, until no further transactions are found;

refreshing the workspace of the first transaction with the changes to the records acted upon by the further transactions identified in the recursive search; and combining or rejecting the changes and writing the resulting workspace view change or changes to the parent database.

According to a third aspect, there is provided a computer program storage medium comprising instructions that when loaded into the memory of a computer system comprising: a database server, a distributed database system, and a network connecting the database system to the server(s) and the distributed database system, cause the system to: when a first transaction from a live database workspace is opened at a first time, create a data structure, the data structure being automatically modified each time any further transaction's changes are committed to the live database workspace while the first transaction is open, and when the first transaction is closed at a second time that is later than the first time, and a change to data relating to a first record within the database has been made; commit the changes, wherein committing the changes comprises:

recursively searching the data structure to identify further transactions having acted on the first record, and for any further records acted upon by the further transactions, identifying any still further transactions having acted upon the further records, until no further transactions are found;

refreshing the workspace view of the first transaction with the changes to the records acted upon by the further transactions identified in the recursive search; and combining or rejecting the changes and writing the resulting workspace view change or changes to the live database workspace.

Further features and advantages of embodiments and aspects will be apparent from the appended claims.

BRIEF DESCRIPTION OF THE DRAWINGS

Further features and advantages will become apparent from the following description of an embodiment thereof, presented by way of example only, and by reference to the drawings, wherein like reference numerals refer to like parts, and wherein.

DETAILED DESCRIPTION

Geodatabases typically comprise a database which may be accessed by multiple users at any given time. As described above, aspects described herein relate to the process of allowing multiple users to work on the data of a database at any one time through the use of transactions, in which modifications are made to a version of the database, and then may be committed to the parent database once it has been verified that the changes made are correct and are not conflict. A method and system for refreshing a workspace in the context of multiple users working on different transactions is provided. The solution proposed in the present disclosure does not attempt to apply all changes which have occurred to the entire dataset since an open long transaction was started. It recognises that the vast majority of those changes are not relevant as they affect data that is entirely unrelated to the changes that have been made in the open transaction. Aspects described herein provide a way of identifying those changes that are relevant when seen in the context of the open transaction's own changes.

Other completed long transactions whose changes have some kind of direct or indirect relationship to those made in the open transaction are identified. Only changes made by those identified earlier transactions are refreshed into the workspace of the open transaction, in order that the changes can be verified. Furthermore, as long as all changes made by some earlier transaction are refreshed, the resulting state will satisfy any validation rules required for the successful writing of changes to the live database. This is because any earlier, completed transaction must have resulted in a state which satisfies the rules. Here, validation rules means those constraints imposed on the data to be written to the live database which ensure that the data is accurate and consistent. For example, a record may not contain a reference to a further record which no longer exists, or never existed.

Because the only changes that are refreshed are those made in particular earlier transactions which are identified at the point of committing the changes, aspects described herein greatly improve the speed of committing changes to a large database structure.

An earlier transaction's changes have a direct relationship to changes made in the open transaction if one or more of those changes conflicted with a change made in the open transaction. A conflicting change occurs where two transactions modify data relating to the same database record. Identifying those earlier transactions with a direct relationship to changes made in the open transaction is the starting point for deciding which earlier transactions are relevant.

Refreshing the open transaction's workspace with an update made by some earlier transaction might also make visible a change due to another earlier transaction which updated the same database record. That other transaction might have completed earlier than the one whose changes we want to refresh (see Example 1), or later than it (see Example 2). Refreshing an update always makes its most recent version visible, so attempting to make a first earlier transaction's change to a record visible might also make visible further changes made by a more recent second transaction.

To ensure we arrive at a state that satisfies validation rules, which require that, for example, the data to be saved satisfies a particular format or that no gaps appear in a spatial dataset (see example 3), we must make all of an earlier transaction's changes visible whenever we decide to make any of them visible. Once it is discovered that the changes of a further transaction are being exposed, all changes made by that further transaction must be refreshed.

When the further transactions changes are refreshed into the open transaction's workspace, it might then be discovered that other records that have been changed in the new transaction incorporate changes made in another transaction.

Only transactions which completed more recently than the open transaction started are relevant to this process. Changes made by transactions which completed earlier than that have always been visible in the open transaction's workspace, and therefore there exists no need to refresh them.

These considerations lead to the rules given in the next section for deciding which earlier transactions are relevant.

Figure 1:
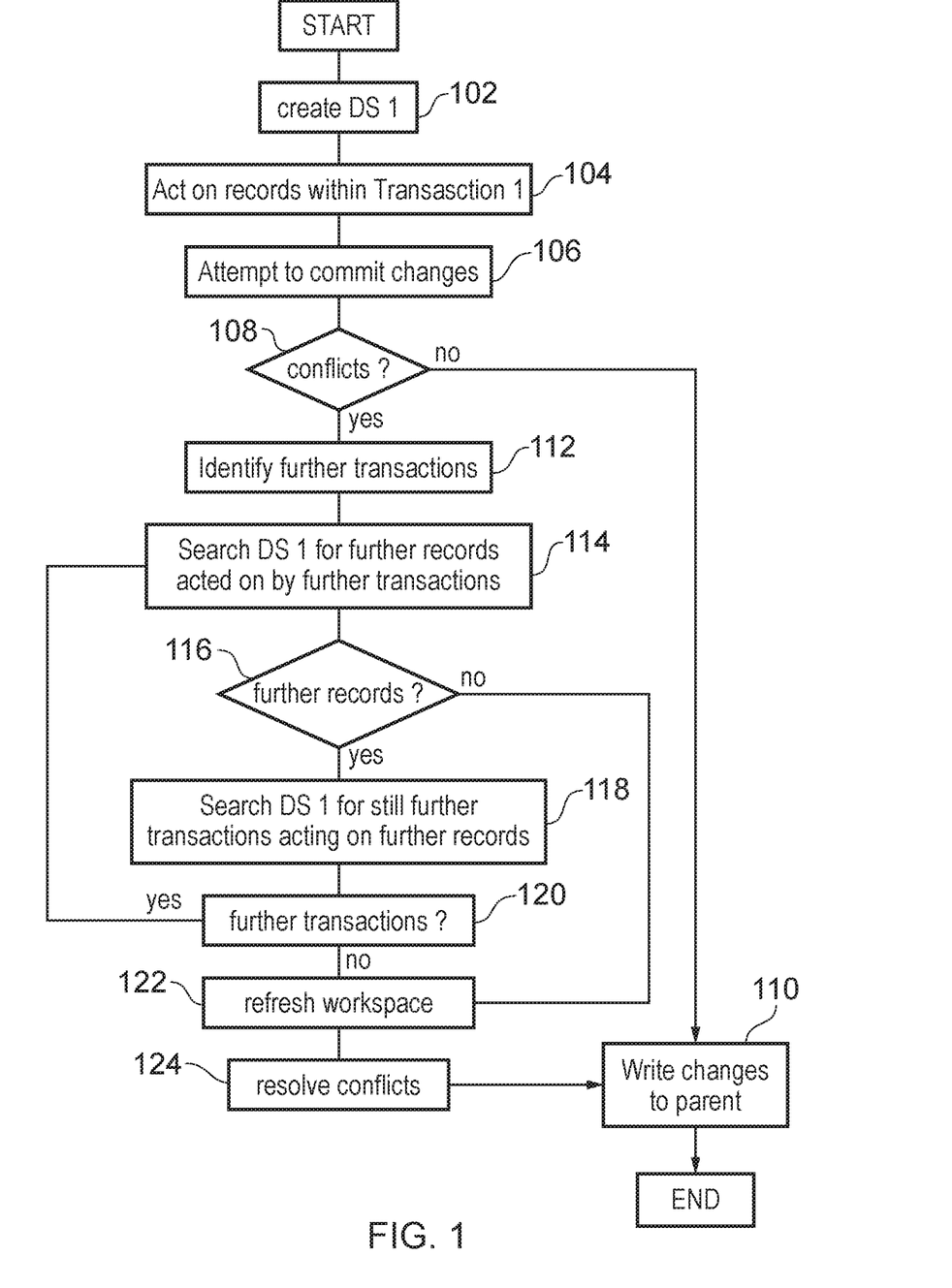
FIG. 1 is an overview of an example process according to aspects of the present disclosure.

FIG. 1 shows a flow chart describing an example process according to the present disclosure. The process is started at step 100 when a user opens a transaction workspace view of a database at a start time Ts. This instantiates a snapshot of the live database incorporating the state of the live database at time Ts, including all changes and updates made to the database prior to time Ts. The live workspace is maintained at a local database server. The user may view the open transaction workspace at a local terminal, or may connect to the local server via a network connection, for example a LAN/WLAN or internet connection. At step 102 a database structure DS1 is created. The database structure comprises a lookup table that is updated every time a transaction commits any changes back to the local server. The updates to the database structure include the transaction ID of the transaction which has acted upon the database, and also a list of all the records whose related data has been modified. The database structure is further described below. The database structure refers to information relating to the changes to the database made while the first transaction is open. It may also simply refer to an existing master table which is maintained with respect to the database and exist prior to the user opening the transaction workspace. Information relating to which records each long transaction acts on is stored in this master table, being updated each time a long transaction is committed.

The user acts on the open transaction workspace to modify records or data relating to records, within the workspace at step 104. These changes are only made locally to the user and are only visible to the user at this stage. At step 106, the user attempts to commit the changes that have been made back to the live workspace. The commit process, in other words writing the changes into the live workspace, comprises the following steps.

If conflicts are detected at step 108, the open data transaction must have its workspace refreshed, as described above, in order to see the changes made visible by conflict resolution in the context in which they were made, i.e. to also make visible other, non-conflicting, changes with which they are related. The detection of conflicts involves checking the lookup table to detect whether the records acted upon by the open transaction workspace have been modified by any further transaction in the time that has elapsed since time Ts. Where no conflicts are detected, the changes made within the open transaction are written to the live workspace at step 110 and the process terminates.

Where conflicting changes are detected, the further transaction or transactions that have acted upon the same database record or records are identified, and the lookup table is searched to identify whether the further transaction or transactions have acted upon any further records acted upon by those transactions. (steps 112 and 114).

If the transactions identified in step 112 have not acted upon any further records, the open transaction workspace is refreshed with the changes made in the further transactions, in order that the conflicting changes can be combined together, and/or one or more of the conflicting changes can be rejected such that a state which satisfies any validation rules in place can be achieved (steps 122-END). At step 110 the valid state is written to the live workspace and the process ends.

Where further records are identified at step 116 the process moves to step 118 in which the lookup table of the data structure is searched for further transactions which have acted upon the identified further records. If further transactions are detected at step 120, the process moves back to step 114. The procedures outlined in steps 112 to step 120 therefore define a recursive search for all transactions which have acted upon an identified record, and then for all of the records acted upon by these further transactions, still further transactions may be identified, and so on. This is explained further in the examples provided below.

Once no further transactions are identified to have acted upon the records detected by the recursive search, the changes to the identified records are refreshed into the open transaction's workspace in order that the conflicts can be viewed in their proper context, and so the validation with respect to the validation rules can be carried out, as described above (steps 122-124. The changes made are re-ordered into an order which ensures referential integrity as they are applied. Once the conflicts are resolved, the changes are written (saved) back to the live workspace and the process ends.

A further step, (not shown) is to write the changes and open transaction identifier to any data structure lookup tables which exist for other open transactions, in order that the process can be carried out successfully for subsequent transaction's committal of changes. This is triggered automatically by the successful committing of changes to the live workspace.

The data structure may alternatively be created from a master table maintained by the live workspace at the time of committing the changes, with those entries in the table existing prior to the creation of an open transaction workspace being excised from the data structure, since they are already visible in the open transaction workspace.

Alternatively, the data structure of the master table maintained in the live workspace is referenced to identify the further transactions having acted upon records and the records the further transactions have acted upon, without the creation of a transaction specific data structure. Instead the master table is maintained, and entries can be removed from this table once there are no longer any open transactions that were opened before their transaction was committed.

To re-state, an earlier long transaction's changes are directly connected to those made in the open long transaction iff (if and only if) at least one of them conflicted with a change made in the open transaction. This is true if 'conflicted' is taken to mean 'incompatible for reasons of referential integrity', as well as simply 'acting on the same database record'. There are cases where two transactions' changes are incompatible, even in the case that they don't act on the same record: One transaction may create a reference to a record and a subsequent transaction deletes that record.

An earlier long transaction's changes are indirectly connected to those made in the open long transaction if:

That transaction completed more recently than the open transaction started and at least one of its changes is to a record (or references or de-references a record) that was also changed by another long transaction whose changes are directly or indirectly connected to those made in the open long transaction.

Because the second condition can connect long transactions that are indirectly connected to the open transaction to each other, it is recursive. An earlier long transaction can be indirectly related to the open transaction via an arbitrary number of steps.

The process of discovering the relevant transactions is a graph traversal. Each of the graph's nodes is an earlier (i.e. completed) long transaction and each edge is an interdependency between two earlier long transactions due to there being at least one record which both have acted upon, or a case in which one transaction creates a reference to a record which the other deletes.

The traversal starts from those transactions that have acted on some database record that was in conflict, and have done so more recently than the open long transaction was started. From each of these, a search is made for other earlier long transactions that acted on any record that it acted on, and did so more recently than the open long transaction was started.

Each time another long transaction is discovered, a new search must be made using its changes, to test for the existence of further long transactions that have acted on any of the records that transaction changed. This process continues until no further long transactions are found.

The ability to search for firstly records acted on by a completed transaction, and secondly for completed transactions which acted on a particular record can be provided by maintaining a database table which maps long transaction IDs to the record IDs (with table names) of database records they acted on (also to unchanged records which they created or removed references to) and which is efficiently searchable on either the transaction ID field or the record ID field. This is only needed for long transactions which have successfully completed.

Below are example definitions for a table and an associated lookup table which illustrate this. Here, the term 'feature' is used instead of 'record'. 'Feature' is a term commonly used with geographic data. It simply means a representation of something which exists on the ground. An action on a feature can be:
1. Creating the feature
2. Modifying the feature
3. Deleting the feature
4. Referencing (creating a reference to) the feature
5. De-referencing (removing a reference to) the feature Creating a reference to a feature, or removing such a reference is regarded as 'acting on' the feature, even though the feature doesn't change.

A master table can be maintained as part of the process of committing a long transaction, e.g. by database triggers. As part of the transaction completion process, a database structure can be created from the master table, in which entries for transactions which completed earlier than the oldest active long transaction was started can be removed, since transactions' changes are already visible in every active long transaction's workspace. Alternatively the table can be created at the point which a transaction is opened, and updated by database triggers which occur at the time of further transactions committing their changes to the live database workspace.

Records needing to be 'refreshed' can then be found using only the information in this table and, separately, a record of when each completed long transaction committed following the steps outlined below:
1. Start from the records that were in conflict.
2. Use the table to find any earlier long transaction(s) which:
   Acted on one or more of these records.
   And
   Has not already been discovered.
   And
   Committed more recently than the transaction whose workspace we want to refresh was started.
3. Use the table to identify all the records acted on by any transaction identified in 2.
4. Perform steps 2 and 3 again, this time starting from the records identified in 3.
5. Repeat 4 until no new further transactions are found.

The process will now be described with reference to three simplified example situations.

Example 1

Example 1 shows a case where two earlier transactions (A and B) must be connected together and the changes made by both must be refreshed into an open transaction (C). Here, it is because the version of record RB resulting from transaction B's change also incorporates transaction A's change, which has a dependency on another change made by transaction A.

Figure 2:
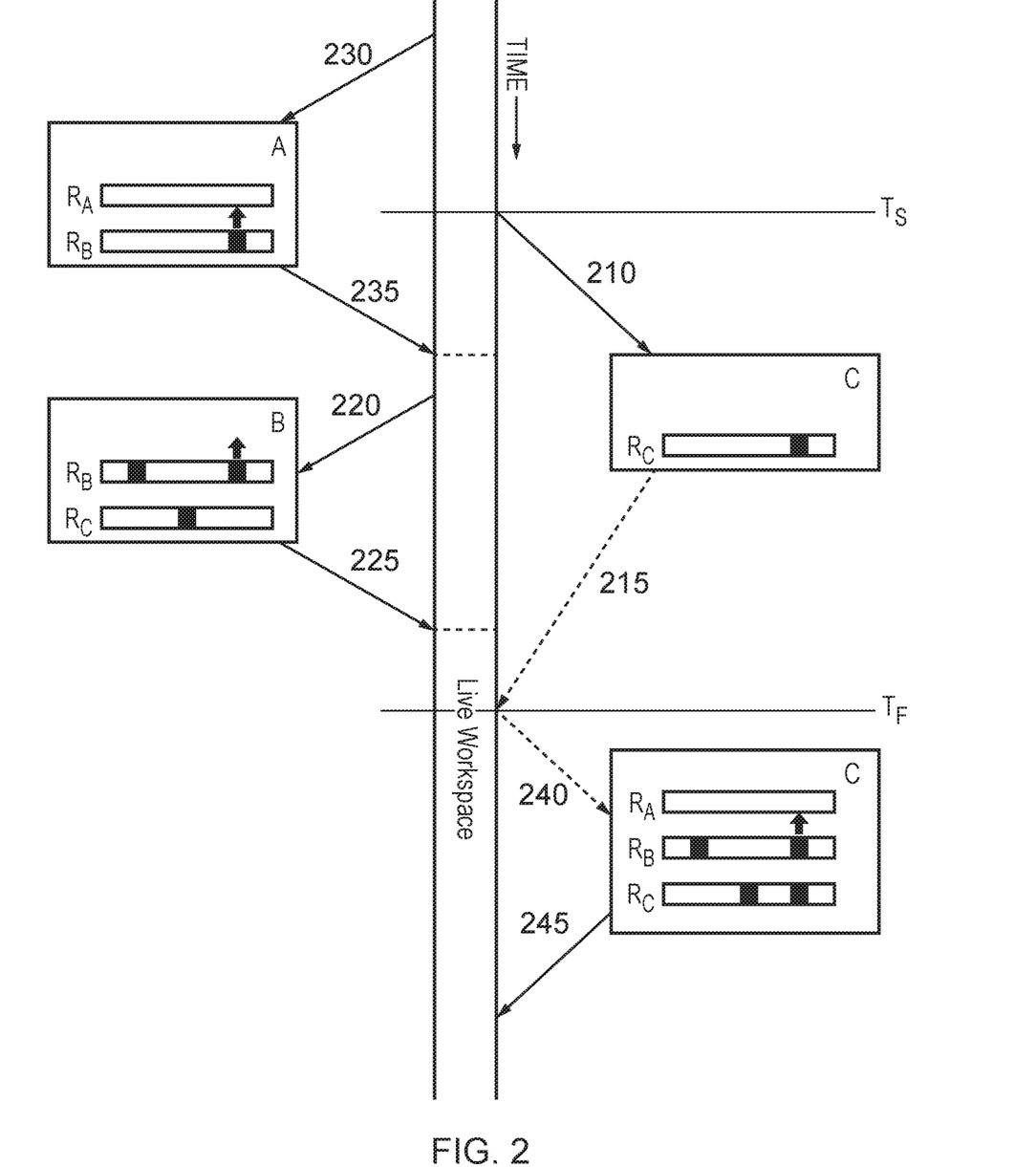
FIG. 2 is an overview of an example transaction/workspace timeline according to the one or more illustrative aspects described herein.

In FIG. 2, a live workspace exists and multiple users are able to create transactions from the state of the live workspace at different points in time. Transaction C is opened and a workspace created at time $T_s$ as denoted by arrow 210. Changes that have appeared in the live workspace more recently than this time are not visible in the transaction C workspace. If they are to be made visible, in order to ensure validation rules are satisfied, they need to be 'refreshed' into the transaction C workspace.

Transaction C operates on database record Rc, changing the data associated with it. Once the work is completed, a merge attempt is made at 215. The merge attempt made at 215 results in a conflict with transaction B, which was created at 220 and merged its changes to the Live workspace at 225. The conflict arises because transaction B updated record Rc which means that the changes to Rc made by B and C must be combined, or if the changes are incompatible, one of the changes must be rejected. However, transaction B also updates record RB, and the resulting version of record RB incorporates an earlier transaction's change. Prior to time Ts transaction A's workspace was created at 230. The work carried out in transaction A's workspace included the creation of record $R_A$ and an update of record RB which is dependent on the existence of record $R_A$. The change is merged/committed to the live workspace at 235.

Therefore, after resolving the single conflict on record Rc, all changes made by the earlier transaction which updated that record, transaction B, must be refreshed into the workspace of transaction C. This is done in order to make sure the context of transaction B's change to record Rc is clear to a user (or an automated validation process) working in the transaction C workspace. Transaction B's update to record RB is therefore made visible in transaction C's workspace.

Because transaction B's updated version of record RB incorporates the earlier change to that record by transaction A, the act of 'refreshing' the update by transaction B into the transaction C workspace unavoidably also makes visible a change by transaction A. Unless all of transaction A's changes are also refreshed into transaction C's workspace, the context of that change is not then clear.

In this example, the problem is actually more serious. The change made by transaction A was to create a new reference to record $R_A$. Because record $R_A$ was initially created by transaction A, unless transaction A's changes are refreshed into transaction C's workspace, attempting to refresh the change to record RB will attempt to violate referential integrity defined in database validation rules and will fail (because record $R_A$ is not visible in the transaction C workspace prior to the refresh procedure).

Example 2

This is a further example of a case where two earlier transactions need to be connected together and the changes made by both to be refreshed. Here, it is because the version of record RB resulting from transaction A's change has been superseded by the version resulting from transaction B's change, which has a dependency on another change made by transaction B. Refreshing a record always makes visible the most recent version existing in the parent workspace.

Figure 3:
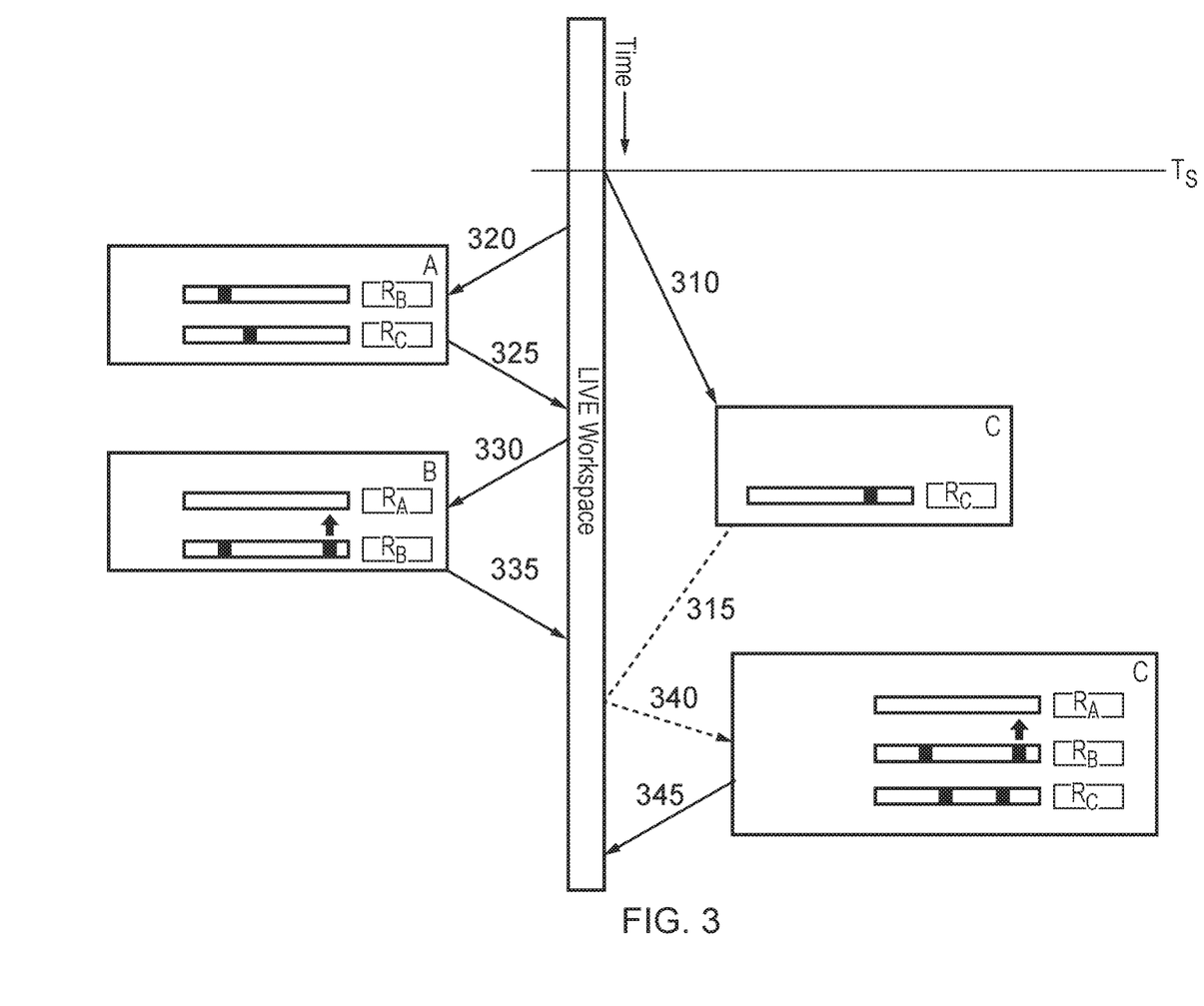
FIG. 3 is an overview of a further example transaction/workspace timeline according to the one or more illustrative aspects described herein.

As in Example 1, transaction C is opened and a workspace created at time $T_s$ as denoted by arrow 310. Transaction C operates on database record Rc, changing the data associated with it. Once the work is completed, a merge attempt is made at 315. The merge attempt made at 315 results in a conflict with transaction A, which was created at 320 and merged its changes to the Live workspace at 325. The conflict arises because transaction A updated record Rc which means that the changes to Rc made by A and C must be combined, or if the changes are incompatible, one of the changes must be rejected.

After resolving the single conflict on record Rc, all changes made by the earlier transaction which updated that record, Transaction A, must be refreshed into the workspace of Transaction C. This is done in order to make the context of Transaction A's chance to record Rc clear to a user (or an automated validation process) working in the Transaction C workspace. Transaction A also updated record RB, so changes to this record will also be refreshed into Transaction C's workspace.

Refreshing changes to a record into a workspace always makes visible the most recent version of the record existing in the parent workspace. It is therefore the version of record RB which resulted from Transaction B's change which is made visible in the Transaction C workspace A. A change made by Transaction B is therefore unavoidably made visible in the Transaction C workspace. Unless we also refresh all of Transaction B's changes into Transaction C's workspace, the context of that change is not then clear.

As with the previous example, the situation is more problematic. The change made in Transaction B was to create a new reference to record $R_A$. Because record $R_A$ was initially created by Transaction B, unless we refresh all of Transaction B's changes into Transaction C's workspace, attempting to refresh the change to record RB will attempt to violate referential integrity and fail, because record $R_A$ is not visible in the Transaction C workspace.

Therefore, in the context of FIG. 3, at 340, the refresh process includes the creation of record $R_A$, the update to record RB with reference to record $R_A$; subsequently the resolution of the conflict on record Rc can take place. The refresh process has therefore included all of the further transactions acting on the records of the present open transaction (C) and also any still further transactions acting on the records in the further transaction(s).

These examples only include one further transaction beyond that which caused the conflict, however the recursive nature of searching through transactions and records means that the number of further transactions which may be located is limited only by the number of transactions that act on a related record in the time between the opening of a local transaction and the attempt to commit changes that results in a conflict.

The following example shows how the process works in the case that multiple further transactions must be refreshed into the live workspace, in the context of a database of spatial features. 'Feature' is a term commonly used with geographic data. It simply means a representation of something which exists on the ground.

Example 3

Figure 4:
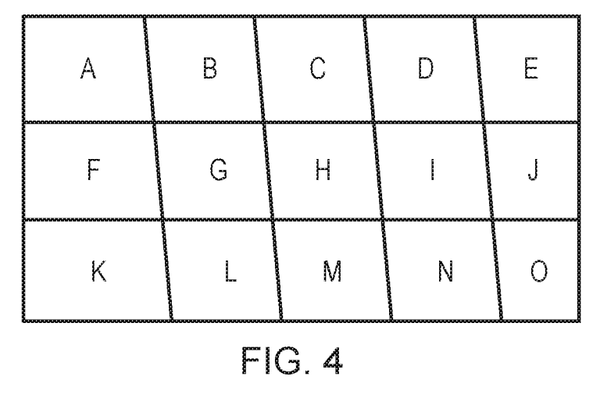
FIG. 4 is a drawing of an example set of features in a live workspace, which may be worked upon by multiple user transactions, each feature having polygon geometry.

FIG. 4 shows a set of spatial features, each denoted by a letter, all having polygon geometry. In a large scale feature dataset such as the OS MasterMap©, maintained by the applicant, the features must tessellate. It will be appreciated that in such a feature set, altering the geometry of a feature will necessarily alter that of a neighbouring feature. The state of the workspace in FIG. 4 is extracted from the Live workspace to be worked on by transaction H.

FIGS. 5*a* to 5*g* show successive transactions (transactions A to G) operating on different features within the dataset, while transaction H is working on the state of the feature set shown in FIG. 4. The changes made in transactions A to G are not visible in the workspace of transaction H. Through FIGS. 5*a* to 5*h* the letters in large font indicate features whose geometry is changed in the transaction shown, bold letters indicate features which are changed in more than one of the transactions shown, and letters in italics indicate features where the change shown results in a conflict.

Figure 5A:
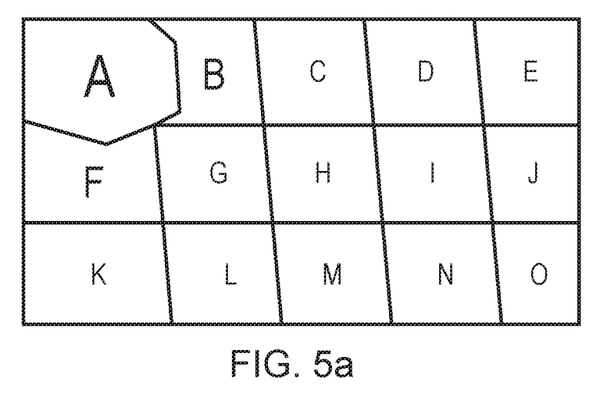
FIGS. 5a to 5g show the effects of different transactions sequentially acting upon the feature set of FIG. 4.
Figure 5B:
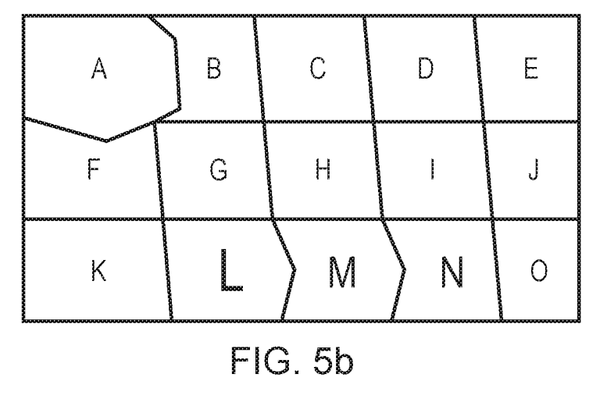
Figure 5C:
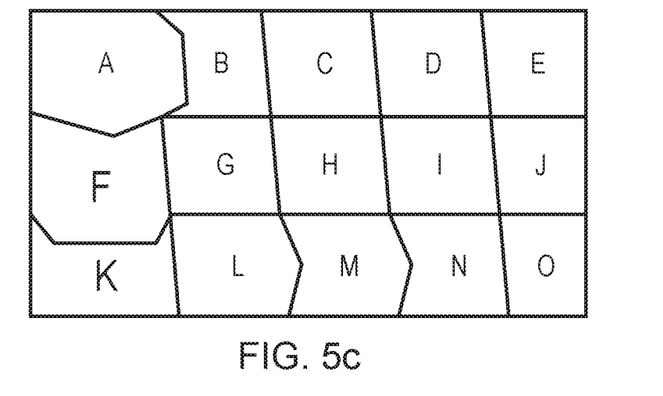
Figure 5D:
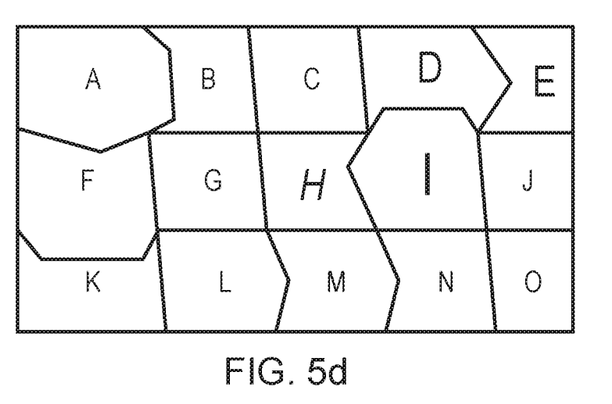
Figure 5E:
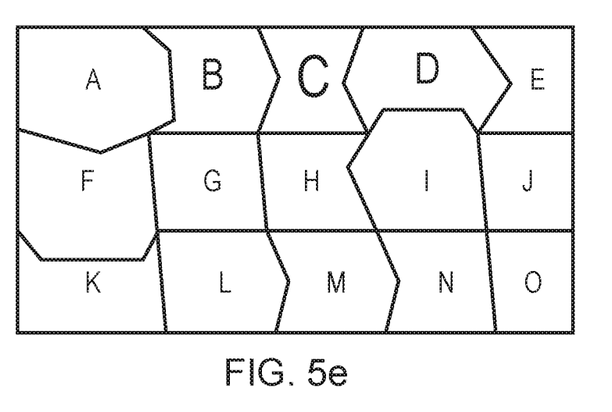
Figure 5F:
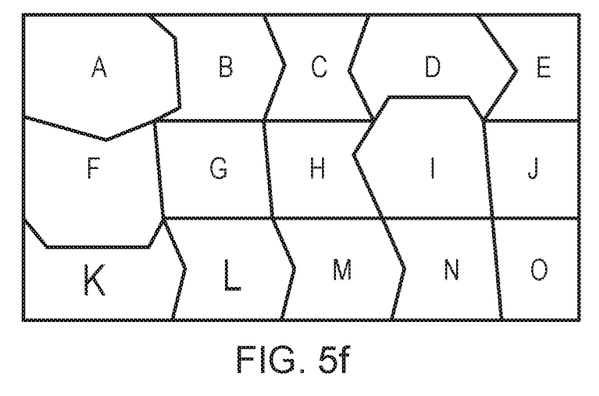
Figure 5G:
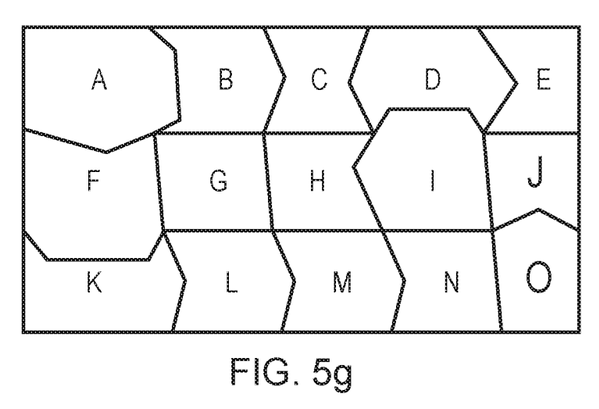
Figure 5H:
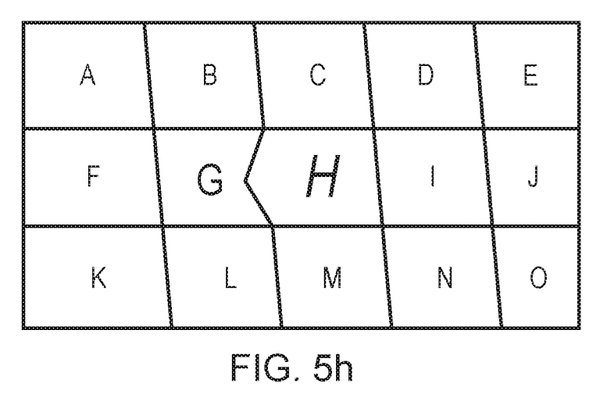
FIG. 5h shows a separate transaction acting upon the feature set of FIG. 4.

Transaction A (in FIG. 5*a*) expands the size of feature A, which necessarily modifies the boundaries of features B and F. Transaction B changes Features L, M and N, shown in FIG. 5*b*. Transaction C changes Features F and K, and this is shown in FIG. 5*c*. Transaction D changes Features D, E, H and I (FIG. 5*d*). Transaction E changes Features B, C and D (FIG. 5*e*). Transaction F changes Features K and L (FIG. 5*f*). Transaction G changes Features J and O (FIG. 5*g*).

Figure 6A:
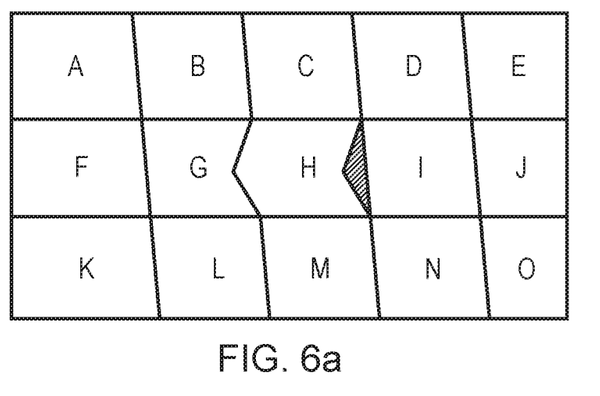
FIG. 6a shows the feature set of FIG. 5h where a conflict has been resolved.

Transaction H operates on feature H, and this also causes a resulting change in feature G. When the user working on transaction H attempts to commit the change back to the live workspace, a conflict arises since transaction D also operated on feature H. The state in the transaction H workspace following resolution of the conflict on feature H is shown in FIG. 6*a*. Changes made to the geometry of Feature H by Transaction D and Transaction H have been combined. The shaded area lying between feature H and feature I is a 'gap' that is not covered by the geometry of any feature. This does not satisfy business validation rules applying to a spatial feature set and so an error occurs if not resolved.

Figure 6B:
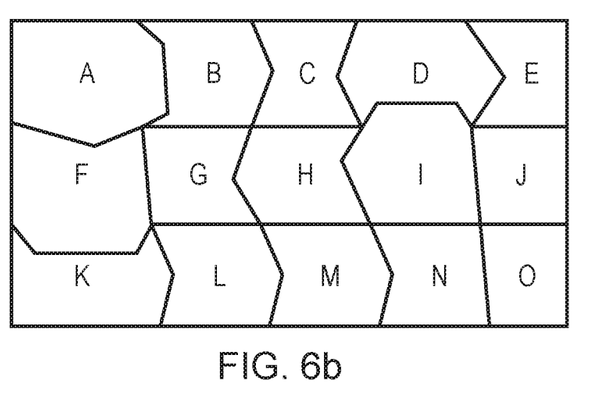
FIG. 6b shows the feature set once the workspace has been refreshed according to the one or more illustrative aspects described herein.

When operated, the recursive process described above should lead to a system state which shows all of the relevant changes to the features, as can be seen in FIG. 6*b*. Note that the changes from transaction G, to features J and O are not visible.

Figure 7:
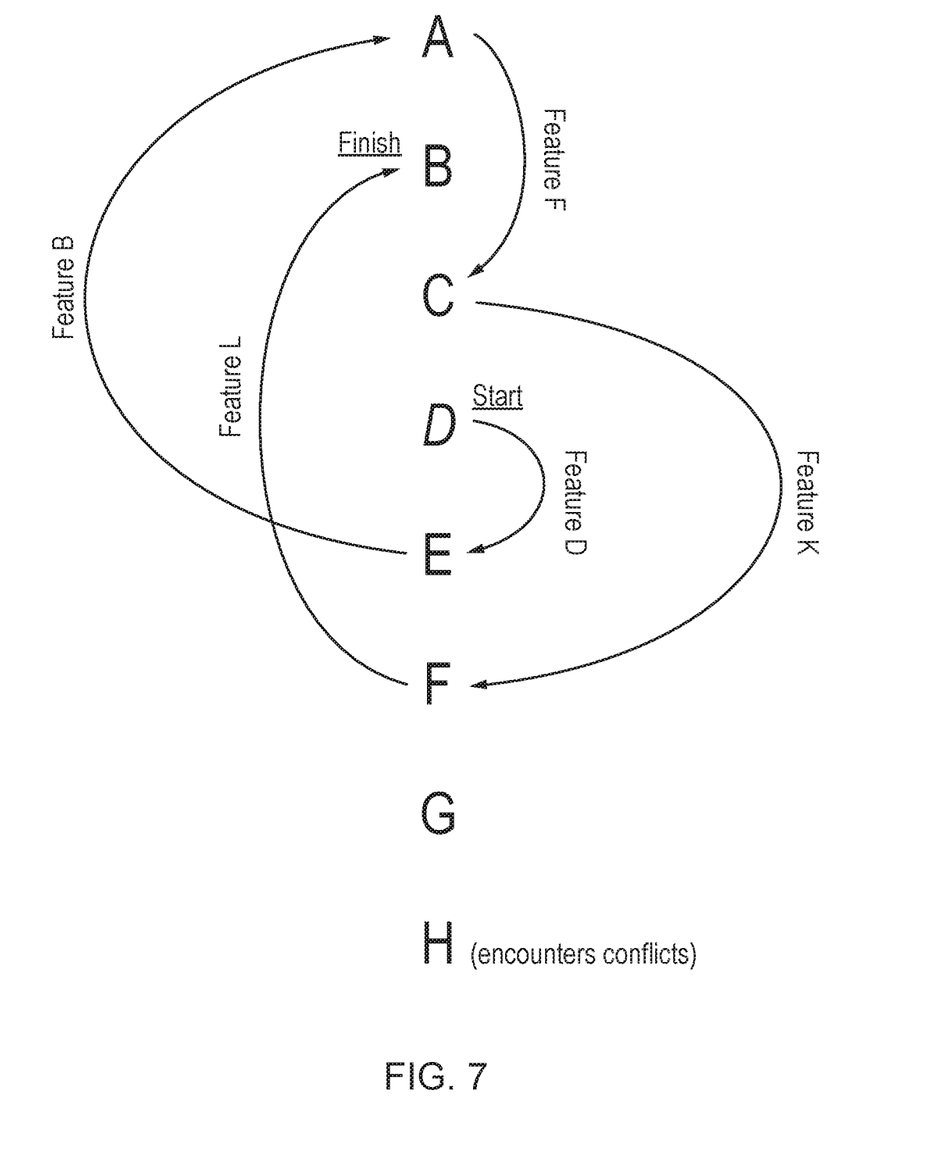
FIG. 7 shows a pictorial outline of a graph traversal carried out to refresh the feature set through the transactions outlined in FIGS. 5a to 5g, according to the one or more illustrative aspects described herein.

The transaction discovery graph for this example is shown in FIG. 7, and the steps shown are described below, having reference to the relevant ones of FIGS. 5*a*-5*g*.

1. Transaction H's change to Feature H conflicts with the earlier change made by transaction D. Transaction D's changes are therefore directly connected to transaction H's. Transaction D's changes must be refreshed into the Workspace of transaction H.
2. The version of Feature D resulting from transaction D's change has been superseded by the version resulting from transaction E's change. Transaction E's changes must also therefore be refreshed into the Workspace of transaction H.
3. The version of Feature B resulting from transaction E's change incorporates the change made by transaction A. Transaction A's changes must also therefore be refreshed into the Workspace of transaction H.
4. The version of Feature F resulting from transaction A's change has been superseded by the version resulting from transaction C's change. Transaction C's changes must also therefore be refreshed into the Workspace of transaction H.
5. The version of Feature K resulting from transaction C's change has been superseded by the version resulting from transaction F's change. Transaction F's changes must also therefore be refreshed into the Workspace of transaction H.
6. The version of Feature L resulting from transaction F's change incorporates the change made by transaction B. Transaction B's changes must also therefore be refreshed into the Workspace of transaction H.
7. The changes made by transaction G are not reachable from the changes made by transaction H and do not need to be refreshed.

Once all of the transactions have been identified the conflicts are seen in the context of all of the relevant changes which have occurred to the feature set in the time that has elapsed since workspace H was instantiated at time $T_s$. Only those features which are relevant have been refreshed, and therefore a full system refresh is not necessary, saving both time and processing power.

Various modifications, whether by way of addition, deletion, or substitution may be made to the above mentioned embodiments to provide further embodiments, any and all of which are intended to be encompassed by the appended claims.

The invention claimed is:
1. A method, comprising:
opening, by a computer processor, a transaction workspace view within a live workspace of a parent database stored in a computer memory at a first time, the parent database comprising a number of database records, and wherein the transaction workspace view is opened in response to a first transaction being opened;

creating a data structure, the data structure arranged to include any changes from one or more further transactions which are committed to the parent database while the first transaction is open;

within the first transaction, making a first change to data relating to a first record within the parent database;

attempting to commit the first change at a second time that is later than the first time, wherein attempting to commit the first change comprises:

recursively searching the data structure to identify further transactions having acted on the first record, and for any further records acted upon by the further transactions, identifying any still further transactions having acted upon the further records, until no further transactions are found; and refreshing the transaction workspace view of the first transaction with the changes to the records acted upon by the further transactions identified in the recursive search;

resolving any conflicts between the first change and the changes to the records acted upon by the further transactions based on the refreshed transaction workspace view; and committing the first change in dependence on any resolved conflicts.

2. A method according to claim 1, wherein the data structure comprises a transaction identifier and a record identifier for each transaction which has committed changes to a record of the parent workspace database after the first time.

3. A method according to claim 1, wherein the database records relate to spatial features.

4. A method according to claim 1, wherein recursively searching the data structure comprises:
i. identifying, using the data structure, a second transaction having made a change to the first record at a time between the first time and the second time;
ii. identifying, using the data structure, a further record acted upon by the second transaction;
iii. identifying, using the data structure, whether a further transaction has acted upon the further record and committed a change to the parent database, and if so:
iv. repeating step ii) and step iii) for any identified further transaction, until no further transaction is identified;
v. incorporating the change or changes identified in steps ii) to iv) into the transaction workspace view of the first transaction.

5. A method according to claim 1, further comprising rejecting or combining the change or changes identified in the recursive search; and committing the resulting workspace view change or changes to the live workspace of the parent database and closing the first transaction.

6. A method according to claim 1, wherein the recursive search of the data structure comprises traversing a graph, wherein the graph nodes are earlier completed transactions that have been completed during the first transaction, and each graph edge between two nodes signifies that there exists at least one record that both earlier completed transactions have acted upon.

7. A method according to claim 1, wherein acting upon a record comprises at least one of: creating a record, modifying a record, deleting a record, creating a reference to a record, removing a reference to a record.

8. A method according to claim 1, wherein refreshing the workspace view includes ordering the changes made by the further transactions to maintain the referential integrity of the data.

9. A method according to claim 1 wherein creating the data structure takes place as part of closing the first transaction, and comprises referencing a master table comprising changes made to the live workspace of the parent database, and removing any reference to transactions which were completed before the first transaction was opened.

10. A method according to claim 1 wherein creating the database structure takes place as part of opening the first transaction, and is updated by database triggers, triggered when any further transaction is completed and commits changes to the live workspace of the parent database.

11. A networked computer system comprising:
a database server;
one or more of a survey server, an update server, a plurality of mobile survey devices;
a distributed database system; and
a network connecting the distributed database system to the one or more survey servers, the update server, and the plurality of mobile survey devices, the system being configured to:
open a transaction workspace view within a live workspace off a parent database at a first time, the parent database comprising a number of database records, and wherein the transaction workspace view is opened in response to a first transaction being opened;
create a data structure, the data structure arranged to include any changes from one or more further transactions which are committed to the parent database while the first transaction is open;
within the first transaction, make a first change to data relating to a first record within the parent database; and
attempt to commit the first change at a second time that is later than the first time, wherein attempting to commit the first change further comprises:
recursively searching the data structure to identify further transactions having acted on the first record, and for any further records acted upon by the further transactions, identifying any still further transactions having acted upon the further records, until no further transactions are found; and
refreshing the transaction workspace view of the first transaction with the changes to the records acted upon by the further transactions identified in the recursive search;
resolving any conflicts between the first change and the changes to the records acted upon by the further transactions based on the refreshed transaction workspace view; and
committing the first change in dependence on any resolved conflicts.

12. A system according to claim 11, wherein the data structure comprises a transaction identifier and record identifier for each transaction which has committed changes to a record of the parent workspace database after the first time.

13. A system according to claim 11, wherein the database records relate to spatial features.

14. A system according to claim 11, wherein recursively searching the data structure comprises:
vi. identifying, using the data structure, a second transaction having made a change to the first record at a time between the first time and the second time;
vii. identifying, using the data structure, a further record acted upon by the second transaction;

viii. identifying, using the data structure, whether a further transaction has acted upon the further record and committed a change to the parent database, and if so:

ix. repeating step ii) and step iii) for any identified further transaction, until no further transaction is identified;

x. incorporating the change or changes identified in steps ii) to iv) into the transaction workspace view of the first transaction.

15. A system according to claim 11, further comprising rejecting or combining the change or changes identified in the recursive search; and committing the resulting workspace view change or changes to the live workspace of the parent database and closing the first transaction.

16. A system according to claim 11, wherein the recursive search of the data structure comprises a traversing a graph, wherein the graph nodes are earlier completed transactions that have been completed during the first transaction, and each graph edge between two nodes signifies that there exists at least one record that both earlier completed transactions have acted upon.

17. A system according to claim 11, wherein acting upon a record comprises at least one of: creating a record, modifying a record, deleting a record, creating a reference to a record, removing a reference to a record.

18. A system according to claim 11, wherein refreshing the workspace view includes ordering the changes made by the further transactions to maintain the referential integrity of the data.

19. A system according to claim 11 wherein creating the data structure takes place as part of closing the first transaction, and comprises referencing a master table comprising changes made to the live workspace of the parent database, and removing any reference to transactions which were completed before the first transaction was opened.

20. A computer implemented method, comprising:

managing a long database transaction to permit refreshing of a workspace view within a live workspace of a database as part of a process of resolving conflicts between competing workspace views operating on same portions of the database, the managing comprising:

creating a separate data structure which logs transactions which commit changes to the database, the data structure being arranged to include changes committed after a first transaction is opened and worked upon within a first workspace view; and committing to the live workspace the changes made to one or more portions of the database in the first transaction, the committing including performing a recursive search using the data structure to identify further transactions having acted upon the one or more portions of the database, and for any further portions of the database acted upon by the further transactions, identifying any still further transactions having acted upon the further portions of the database, until no further transactions are found, wherein the first workspace view is refreshed with any changes to the portions of the database acted upon by the further transactions identified in the recursive search.

* * * * *